United States Patent [19]

Fauvarque et al.

[11] Patent Number: 5,321,791
[45] Date of Patent: Jun. 14, 1994

[54] ORGANIC MATERIAL FOR NON-LINEAR OPTICS

[75] Inventors: Jean-Francois Fauvarque; Christian Amatore; Anny Jutand, all of Paris, France

[73] Assignee: Alcatel N.V., Amsterdam, Netherlands

[21] Appl. No.: 908,825

[22] Filed: Jul. 1, 1992

Related U.S. Application Data

[63] Continuation of Ser. No. 474,712, Apr. 2, 1990, abandoned.

[30] Foreign Application Priority Data

Aug. 1, 1988 [FR] France ............................... 8810372

[51] Int. Cl.$^5$ ............................................. G02F 1/35
[52] U.S. Cl. ..................................... 385/143; 252/582; 359/326; 385/122; 558/423
[58] Field of Search ............... 558/357, 423; 385/122, 385/143, 145; 372/21, 22; 359/326-332; 252/582

[56] References Cited

PUBLICATIONS

*Electro-Optical Communications Dictionary*, Bodson & Botez (Eds.), Hayden Book Company, 1983, p. 50.
Makarov, et al., C.A., 106 (1987); 106: 179111u.
Ruoliene, et al, C.A., 102 (1983); 102:15553f.
Barnik, et al. "Optical Second Harmonic Generation in Various Liquid Crystalline Phases," *Molecular Crystals and Liquid Crystals*, vol. 98, No. 1/4, pp. 1-12 (1983).
Williams, David J., "Organic Polymeric and Non-Polymeric Materials with Large Optical Nonlinearities," *Angew. Chem. Int. Ed. Engl.* 23 (1984), pp. 690-703.
Davydov, B., et al., "New nonlinear organic materials for generation of second harmonic of neodymium laser radiation," *Sov. J. Quantum Electron*, vol. 7, No. 1, pp. 129-131.
S. Allen et al. "A CNDOVSB program for the calculation of second-order molecular polarisabilities, and its application" pp. 20-26, Aug. 1986 San Diego, Calif.
G. Berkovic et al. "Second-order nonlinear polarizability of various biphenyl derivatives" pp. 945-949 Jun. 6th, 1987 Optical Soc. of America US.
E. I. Negishi et al. "Selective carbon-carbon bond formation via transition metal catalysis. 3.1.A Highly selective synthesis of unsymmetrical..." J. Org. Chem., 42 (1977) pp. 1821-1823.
H. Quast and E. Schmitt, "Ylide durch Decarboxylierung von N-Methyl-carbonsäurebetainen des Pyridins, Chinolins und Isochinolins" pp. 43-63, Jul. 23, 1969.

*Primary Examiner*—John D. Lee
*Attorney, Agent, or Firm*—Robbins, Berliner & Carson

[57] ABSTRACT

An organic material for non-linear optics, in which the structure of the molecule includes an electron donor group and an electron attractor group connected by means of an electron-transmitting group, the material being characterized by the fact that it satisfies the formula:

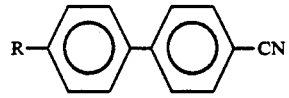

where R is selected from (CH$_3$)$_2$N and CH$_3$O, with the first material being dimethylamino 4, cyano 4' biphenyl and the second being methoxy 4, cyano 4' biphenyl.

4 Claims, No Drawings

ORGANIC MATERIAL FOR NON-LINEAR OPTICS

This is a continuation of application Ser. No. 07/474,712, filed 2 Apr. 1990, now abandoned.

The present invention relates to an organic material for non-linear optics.

Materials having non-linear properties in optics may be used for numerous applications: frequency doublers; optical bistables; switches; modulators; directional couplers; parametric amplifiers; etc. . .

A small number of inorganic materials which are non-isotropic, and in particular non-centrosymmetrical, are known which possess a non-zero second order coefficient and non-linear optical properties. These include in particular potassium-dihydrogen-phosphate (KDP), and lithium niobate and tantalate ($LiNbO_3$, $LiTaO_3$, . . . ).

It is often difficult to make these inorganic materials. That is why interest has been shown in organic materials having non-linear properties, in particular when the materials are polymers, thermoplastic, or film-forming.

Optical non-linearity is generally obtained by incorporating highly hyperpolarizable polar molecules or groups of molecules in the organic material by mixing or by chemical grafting.

Such molecules are synthesized by associating an electron attractor group with an electron donor group via a group for transmitting electron effects.

For example, the following materials are known:
paranitroaniline (PAN)

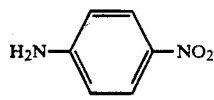

N (nitro 4 phenyl) N methyl amino 2 acetonitrile (NPAN)

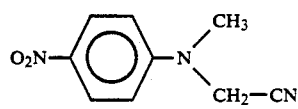

dinitro 2-4 phenyl L alanine (MAP)

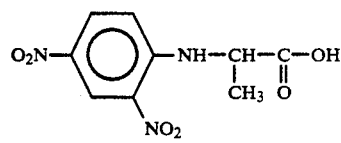

methyl 3 nitro 4 pyridine N-oxide (POM)

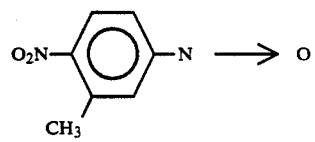

These molecules are characterized by their coefficient of hyperpolarizability $\beta$ defined by the series development of the dipolar moment $\mu$ as a function of the electric field E $$\mu=\mu_0+\alpha E+\beta|E|^2+ \ldots$$

The higher the coefficient $\beta$, the more effective the molecules for non-linear optics. The coefficient $\beta$ may be obtained by using the EFISH method (Electric Field Induced Second Harmonic generation).

If the above-mentioned molecules have a significant coefficient $\beta$, they generally suffer from the drawback of absorbing visible light and of being unusable with relatively short wavelengths.

The object of the present invention is to mitigate this drawback and to obtain organic materials which are usable at higher frequencies than known materials.

The present invention provides an organic material for non-linear optics, in which the structure of the molecule includes an electron donor group and an electron attractor group connected by means of an electron-transmitting group, the material being characterized by the fact that it satisfies the formula:

where R is selected from $(CH_3)_2N$ and $CH_3O$, with the first material being dimethylamino 4, cyano 4' biphenyl and the second being methoxy 4, cyano 4' biphenyl.

The first variant of the material of the invention which satisfies the formula

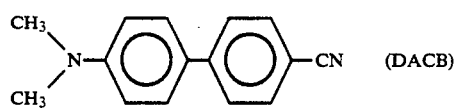

(DACB)

appears as a byproduct of a particular reaction in an article by H. Quast and E. Schmitt (Liebigs Ann. Chem 732, 42, 63–1970); no application of this material is described, but a method of synthesis is proposed therein by decomposing diazonium salts and coupling the dimethylaminophenyl radical with benzonitrile, giving a yield of 22% during an operation which is relatively long and difficult to implement.

The present invention also provides a method of preparing this material by coupling the magnesium derivative

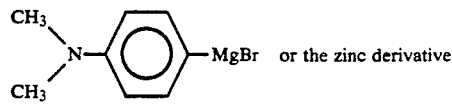 or the zinc derivative

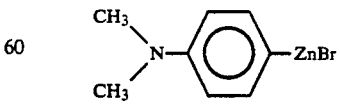

to paraiodocynanobenzene or to parabromobenzonitrile in the presence of catalytic quantities of nickel or palladium complexes, with a yield of 85%.

The second variant of the material of the invention satisfies the formula

(methoxy 4-cyano-4' biphenyl).

According to the invention, this material may be prepared by coupling the magnesium derivative

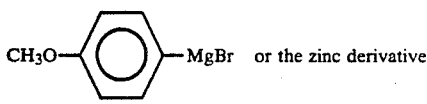

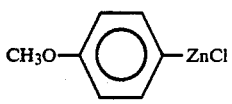

to paraiodocyanobenzene or parabromobenzonitrile in the presence of catalytic quantities of palladium complexes.

Other characteristics and advantages of the present invention appear from the following description of embodiments given by way of non-limiting example.

Initially DACB (dimethylamino 4 cyano 4' biphenyl) is prepared using the following procedure:

1ST STEP 24 grams (g), i.e. 5 m.moles, of dimethylamino - 4 bromobenzene is transformed by the conventional procedure into an organomagnesium compound in 80 ml of tetrahydrofuran (THF) at ordinary temperature:

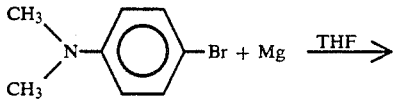

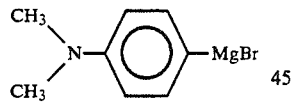

2ND STEP

The resulting solution is added to a solution of 10 m.moles of ZnCl$_2$ dissociated in 60 ml of THF:

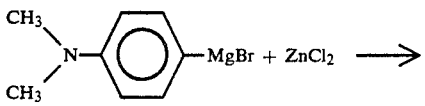

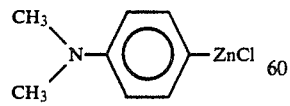

3RD STEP

A solution of 18.5 g of parabromobenzonitrile and 2.3 g of catalyst (triphenylphosphino) palladium is prepared in 100 ml of THF, and the preceding solution is added to the present solution. The following reaction is allowed to continue for 12 hours at ordinary temperature.

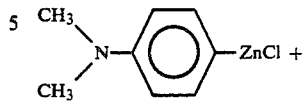

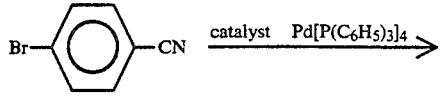

After hydrolysis, extraction, and chromatography in a silica column, 17 g of DACB are recovered.

Such a reaction has a yield of 85%. The palladium complexes are completely inert relative to the CN group and they enable parabromobenzonitrile to be used. It is also possible to use nickel complexes, and to replace the zinc derivatives by the magnesium derivative, even though the magnesium derivative gives parasitic reactions on the nitrile group, thereby reducing yield.

When in the powder state, DACB obtained in this way has the property of generating a second harmonic analogous to that of POM as defined above. This fact is confirmed by measuring its coefficient $\epsilon$. However, in addition, it is completely optically transparent in the visible frequency region of the spectrum and in the near infrared, unlike prior art nitrate derivatives which start absorbing from 400 nanometers. Its absorption is at a maximum at 350 nanometers and its molecular absorption coefficient $\epsilon$ goes from 27,174 at 350 nanometers to 542 at 400 nanometers.

The prior art nitrate derivative

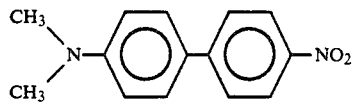

has an absorption maximum at 418 nanometers corresponding to $\epsilon=14,605$ which goes to 7,818 at a wavelength of 450 nanometers Thus, the material of the invention may be used for generating a second harmonic in the blue region of the visible spectrum from a laser in the infrared or the near infrared.

There follows a description of the preparation of another material of the invention: methoxy 4 - cyano - 4' biphenyl

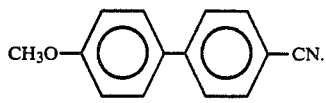

5 m.moles of parabromomethyoxybenzene are transformed into an organomagnesium compound by the conventional method in 50 ml of THF. A solution of 6 m.moles of anhydrous zinc chloride is prepared in 60 ml of THF, with the parabromomethoxybenzene solution being added thereto.

The mixture is then added to a solution of parabromocyanobenzene containing 2.0 g of the palladium catalyst defined above. The reaction is allowed to continue for 12 hours at ordinary temperature. After hydrolysis, extraction and purification by chromatography on a silica column, methoxy 4 cyano 4' biphenyl is recovered. The yield of the reaction is 81%.

The nitrate derivative methoxy 4 nitro 4' biphenyl

is prepared in analogous manner by using 5 m.moles of paraiodonitrobenzene. The yield of the reaction is 72%.

The absorption properties of the two above materials are then compared.

The methoxy 4 cyano 4' biphenyl has an absorption maximum at 302 nanometers with a coefficient ε of 28,523. At 400 nanometers ε is close to zero, and cannot be measured accurately with the method used.

As for methoxy 4 nitro 4' biphenyl, its absorption maximum is at 326 nanometers with a coefficient ε of 13,814 and it is still 738 at 400 nanometers.

The material of the invention is thus particularly advantageous with respect to its optical properties.

Naturally, the invention is not limited to the methods of synthesis described above.

We claim:

1. A non-linear optical device comprising a plurality of hyperpolarizable organic molecules having a non-zero second order coefficient, and means for incorporating said hyperpolarizable molecules in an optical medium having non-linear optical properties, wherein said organic molecules are selected from the group consisting of dimethylamino 4, cyano 4' biphenyl and methoxy 4, cyano 4' biphenyl, and said transmission medium is transparent to visible light.

2. The non-linear optical device of claim 1 wherein the hyperpolarizable molecules are dimethylamino 4, cyano 4' biphenyl.

3. The non-linear optical device of claim 1 wherein the hyperpolarizable molecules are 4, cyano 4' biphenyl.

4. The non-linear optical device of claim 1 wherein said device is selected from the group consisting of frequency doublers, optical bistables, switches, modulators, directional couplers and parametric amplifiers.